United States Patent [19]

Hansen

[11] 4,441,403

[45] Apr. 10, 1984

[54] AERATION FAN MOUNTING SYSTEM

[76] Inventor: James L. Hansen, P.O. Box 233, Crofton, Nebr. 68730

[21] Appl. No.: 138,146

[22] Filed: Apr. 7, 1980

[51] Int. Cl.³ .......................... F16L 37/26; E04H 7/22
[52] U.S. Cl. ....................................... 98/55; 285/158; 285/325; 285/406
[58] Field of Search ................. 285/325, 103, 67, 364, 285/406, 403, 424, 158; 98/52, 53, 54, 55; 34/225, 233

[56] References Cited

U.S. PATENT DOCUMENTS

| 348,556 | 9/1886 | Grueninger | 285/67 |
| 958,043 | 5/1910 | Stockley | 285/325 X |
| 3,941,409 | 3/1976 | Rameau | 285/325 X |
| 4,037,527 | 7/1977 | Steffen | 98/55 |

FOREIGN PATENT DOCUMENTS 2420615 11/1975 Fed. Rep. of Germany ...... 285/325

*Primary Examiner*—Dave W. Arola
*Attorney, Agent, or Firm*—Hiram A. Sturges

[57] ABSTRACT

An aeration fan mounting system having a wall adapter and a fan housing with aligned interior surfaces and held in end-to-end alignment with each other by support bracket assemblies having insertion rings extending outwardly from both the wall adapter and fan housing and also having brackets for holding the insertion rings adjacent each other.

1 Claim, 2 Drawing Figures

AERATION FAN MOUNTING SYSTEM

BACKGROUND OF THE INVENTION

It is common for grain storage to be in round bins and rectangular buildings with many openings therethrough.

In the prior art, it was common to have a tube fixed to the wall of a bin with reinforcing. The fan housing was then brought forward so as to slide onto the tube. But, if the fit is very loose, then much power is wasted. And, if the fit is close, then it is extremely frustrating to try to hold a heavy fan up while trying to place it onto the tube.

The problem is also great where an angle-iron ring has been attached to the bin around an opening. Such rings have holes in them extending parallel to the opening. For cooperation with such rings, fans have holes in a flange protruding therefrom in the prior art. It is then extremely frustrating and difficult to hold a heavy fan in place and move it about very painstakingly so as to line the holes up so that bolts can be put through the flanges of the fan and of the bin-mounted ring.

It is an object of this invention to eliminate this problem by the provision of support bracket assemblies whereby the heavy fan can be brought up to the vertical flange of the mounted ring and then allowed to move downwardly so as to fall into brackets on the ring while simultaneously brackets on the top of the fan housing engage behind the vertical flange of the angle-iron ring on the bin.

Another object is to provide for quick removal of a fan by simply raising it so as to disengage both lower and upper brackets.

SUMMARY OF THE INVENTION

A major goal of this invention is to provide an aeration fan mounting system having a wall adapter and a fan housing with aligned interior surfaces and held in end-to-end alignment with each other by support bracket assemblies having insertion rings extending outwardly from both the wall adapter and fan housing and also having brackets for holding the insertion rings adjacent each other, whereby the heavy fan can be simply passed vertically downward so that the bottom of the insertion ring on the fan can be simply received in upwardly opening bracket recesses on the wall adapter for quick support of the fan.

Another goal is to provide a bracket at the top of the fan ring to receive the top of the adapter ring to finish the fastening, all as assisted by gravity.

DESCRIPTION OF THE PREFERRED EMBODIMENT

Figure 1:
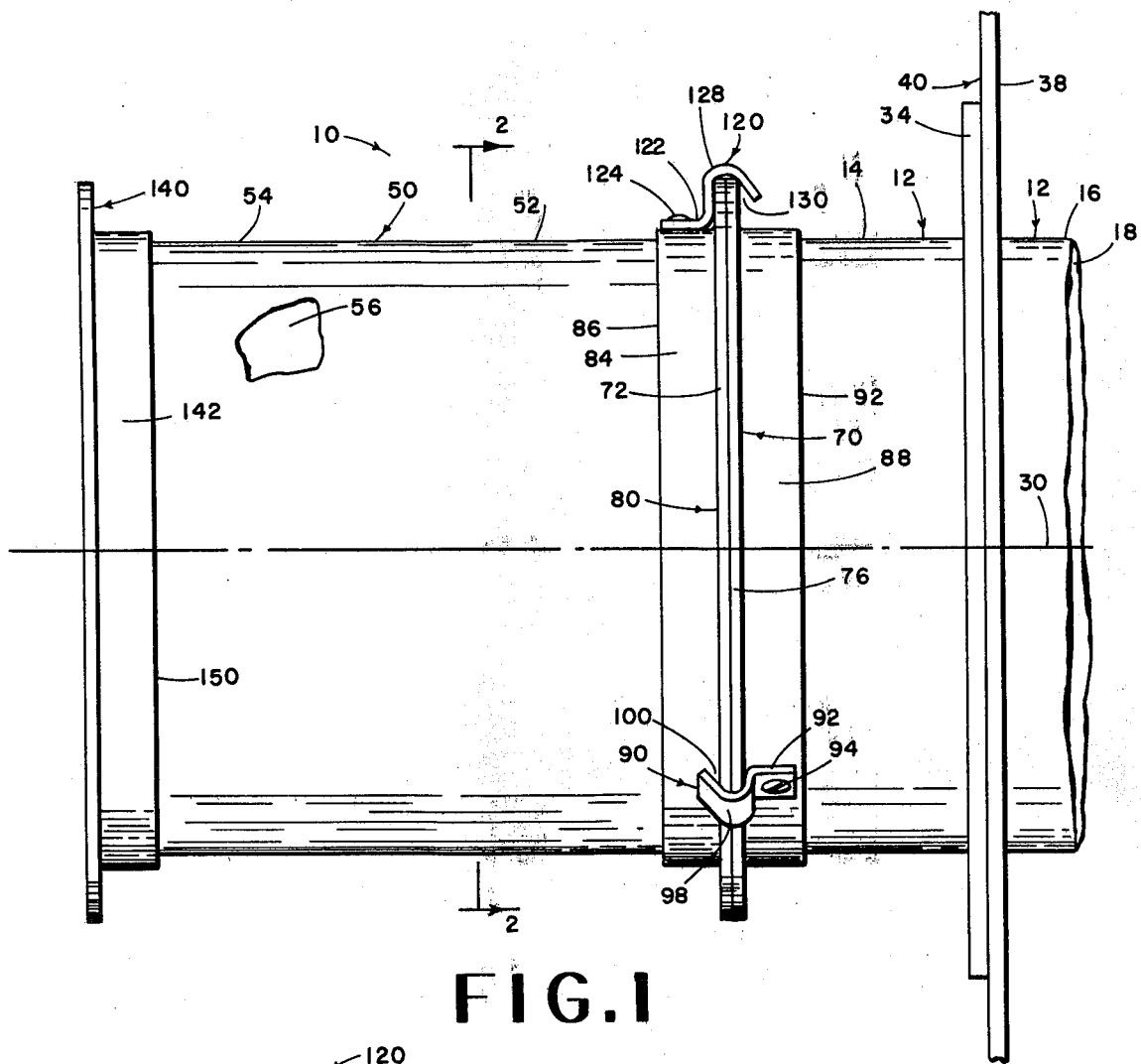
FIG. 1 is a side elevation of an aeration fan mounting system in connection with the wall of a grain bin and having a portion of the fan housing broken away.
Figure 2:
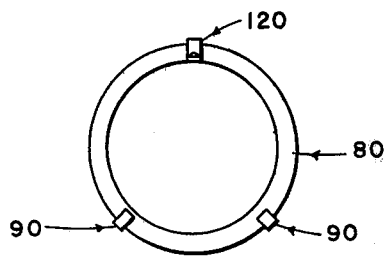
FIG. 2 is a cross sectional view taken along the line 2—2 of FIG. 1.

The aeration fan mounting system of this invention is generally indicated at 10 in FIG. 1, and comprises a wall adapter, generally indicated at 12, having a tubular portion 14, which is of cylindrical shape on its exterior surface 16, and also of cylindrical shape on its interior surface 18.

The surface 18 of the wall adapter 12 is symmetrical about an axis 30. The tubular portion 14 is surrounded by a flange which is fixed to the tubular portion 14, and which is suitably held by a means, not shown, to a wall 38 of a grain bin, generally indicated at 40, the wall 38 being a side wall of the bin.

Aeration fans commonly used with such wall adapters 12 are illustrated by a sample fan 50, shown in FIG. 1, having a tubular housing 52, which is cylindrical on its outer side 54, and also cylindrical on its inner side wall 56, the wall 56 and the inner wall 18 of the wall adapter 12 both being cylindrical about the same aixs 30, and are, therefore, in alignment with each other.

The housing 14 and 52 are arranged adjacent each other and preferably in abutment with each other end-to-end relationship.

The wall adapter 12 has an insertion ring 70 thereon surrounding its housing 14 and substantially disposed in a plane at a right angle to the axis 30, the ring 70 having an abutment surface 72 disposed in a plane at a right angle to the axis 30 and in abutment with a surface 76 parallel thereto of an insertion ring 80 of the fan 50, the ring 80 being similarly disposed substantially in a plane at a right angle to the axis 30 and protruding outwardly from the fan housing 52, being supported by a base 84 of cylindrical shape, fixed by suitable means to the fan housing 52, such as by welding at 86, the insertion ring base 84 of the fan housing 52 being suitably fixed to the insertion ring 80, such as by being of one piece construction therewith. This same method of one piece construction is also used to secure a base 88 welded at 92 to the wall adapter housing 14 to the insertion ring 70 of the wall adapter.

A pair of support brackets 90 have anchored portions fixed by suitable securing means 94, such as bolts to the base 88.

The support bracket 90 further has a supporting portion 98 fixed to the anchored portion 92 and of one piece therewith. The support portion 98 has a supporting recess 100 on its upper side and the latter has walls which convergently incline towards each other at lower ends thereof for guiding the insertion ring 80 of the fan housing thereinto and tightly up against the insertion ring 70 of the wall adapter 12 as the fan housing is vertically lowered so that its insertion ring 80 enters the recesses 100.

At the upper side of the fan housing 50 is a holding bracket 120 provided with an anchored portion 122 fixed to the fan insertion ring base member 84 by means of a suitable bolt 124.

The holding bracket 120 also has a holding portion 128 that is attached to one end of the anchored portion 122.

The holding portion 128 has a holding recess 130 which faces downwardly and extended about and receiving both the ring 80 of the fan housing and the ring 70 of the wall adapter.

The recess 130 is larger at its lower end than at its upper end, whereby its walls converge at their upper ends so that as the fan housing is passed downwardly the wall adapter insertion ring 70 will be deeply guided into the recess 130 whereby the insertion rings 70 and 80 will be tightly drawn together.

The fan housing 50 has a ring 140 at its outer end fixed to a base 142 and of one piece therewith, the base 142 being suitably secured to the fan housing 54, such as by means of welding at 150.

In operation it will be seen that a heavy fan can be put in place by simply allowing it to vertically pass down into the supporting brackets 90, while it is automatically guided into abutment with the wall adapter. At the conclusion of the downward motion the holding bracket 120 receives the insertion ring 70 of the wall adapter, drawing the fan insertion ring 80 tightly up against the wall adapter insertion ring 70.

I claim:

1. An aeration fan mounting system comprising a grain storage building, a wall adapter mounted on said building, a fan housing adapted to have a fan of a size suitable for grain aeration mounted therein, said adapter and fan housing having aligned cylindrical interior and exterior surfaces having a same horizontal axis, said wall adapter and said fan housing being arranged end-to-end adjacent each other, said wall adapter and said fan housing having on the cylindrical exterior surfaces thereof wall adapter-mounted and fan housing-mounted insertion rings thereon and protruding outwardly therefrom substantially radially of said axis and means retaining said wall adapter insertion ring and said fan housing mounted insertion ring on said wall adapter and fan housing, respectively, wall adapter-mounted support bracket means providing upwardly opening support recess means receiving said fan-mounted insertion ring and disposed on opposite sides of said horizontal axis as seen in top plan view at first and second horizontally spaced support points and means securing said support bracket means to said wall adapter mounted insertion ring, a holding bracket means providing a downwardly opening holding recess means disposed above said upwardly opening support recess means and removably receiving said fan-mounted insertion ring whereby as said fan housing is lifted with respect to said wall adapter said fan housing-mounted bracket means is removed from the upper side of said adapter-mounted insertion ring, said support recess means of each of said bracket means being progressively narrower towards its radially outermost portion so as to guide said insertion rings toward each other whereby said fan housing is guided toward said adapter and whereby accuracy of initial placement of said rings in said recesses is not as critical and yet said rings are drawn into a close fit and in axial alignment with each other.

* * * * *